United States Patent
Trap

[15] 3,663,247
[45] May 16, 1972

[54] GLASS

[72] Inventor: Hendrikus Johan Lodewijk Trap, Emmasingel, Eindhoven, Netherlands

[73] Assignee: U.S. Philips Corporation, New York, N.Y.

[22] Filed: Oct. 31, 1969

[21] Appl. No.: 873,091

[30] Foreign Application Priority Data

Nov. 9, 1968    Netherlands............................6816004

[52] U.S. Cl.................................................106/53, 106/54
[51] Int. Cl.......................C03c 3/04, C03c 3/10, H01j 43/00
[58] Field of Search..........................106/53, 54, 49; 313/103

[56] References Cited

UNITED STATES PATENTS

| | | | |
|---|---|---|---|
| 2,584,974 | 2/1952 | Armistead | 106/53 |
| 3,307,958 | 3/1967 | Earl | 106/49 |
| 3,470,002 | 9/1969 | Di Marcello et al. | 106/49 |

FOREIGN PATENTS OR APPLICATIONS 971,733    10/1964    Great Britain....................106/47 UX

*Primary Examiner*—James E. Poer
*Assistant Examiner*—M. Bell
*Attorney*—Frank R. Trifari

[57] ABSTRACT

Glass particularly suitable for use in a secondary emission electrode, after adjustment of the surface conductivity by heating in a reducing atmosphere, and having a composition in percent by weight within the range limited as follows:

| | | | |
|---|---|---|---|
| $SiO_2$ | $30-70$ | $PbO$ | $6-30$ |
| $Al_2O_3$ | $0.5-10$ | $Bi_2O_3$ | $2-45$ |
| $B_2O_3$ | $\leq 5$ | $CaO + SrO$ | $\leq 8$ |
| $Na_2O$ | $\leq 6$ | $MgO$ | $0.5-7$ |
| $K_2O$ | $\leq 10$ | $Sb_2O_3$ | $\leq 2.$ |

2 Claims, No Drawings

GLASS

The invention relates to a range of glass compositions which are particularly suitable for use in a secondary emission electrode. This secondary emission electrode comprises a body having two parallel boundary surfaces and being provided with a plurality of channels which are either or not at right angles to the said boundary surfaces and are open at either end. Both boundary surfaces are coated with an electrically conducting layer and a voltage difference is applied between these layers. Electrons move through the said channels from one side of the electrode to the other side under the influence of the electric field thus obtained.

The secondary emission multiplication in the channels is effected in the following manner. There are comparatively few electrons which travel from one side of the channels to the other without striking the wall. In addition to a forwardly directed velocity component, the other electrons have also a laterally directed velocity component which causes them to strike the wall once or more times when travelling through the channel. In the relevant electrode the walls of the said channels consist of a substance which has the property to be secondarily emissive so that an average of more than one electron is released at every impact. In this manner the number of electrons which leaves the electrode is considerably increased relative to the number of electrons impinging upon the electrode.

To maintain a uniform voltage distribution along the electron paths, it is necessary that sufficient electrons be supplied by the voltage source to replace the secondary electrons which are removed. The specific resistance of the material must, however, not be so low that a noticeable increase of temperature occurs.

It is possible to choose for the material of the body a glass whose specific resistance at room temperature lies between $10^9$ and $10^{12}$ ohm.cm. It is alternatively possible to coat the walls of the channels with a thin layer of material having a suitable surface resistance which material has a secondary emission factor of more than one at the electron velocity caused as a result of the conventional voltage difference.

There are a few known methods of manufacturing a glass body for such a secondary emission electrode, which has a diameter of, for example, 3-10 cm and a thickness of 1-2.5 mm, and a plurality of apertures of $10^5$ per sq.cm, at a mean diameter of approximately 20 $\mu$ for each aperture.

The starting point is a glass tube which is drawn out while being heated. The tubes obtained are assembled to form a bundle and the assembly is again drawn out, bundled in a jig and heated until the material of the walls of the tube is interconnected together and fills up the interstices by flowing of the material.

Since it is difficult to avoid that the channels are damaged, deformed or clogged upon drawing out and melting together, the method according to which a core is present in the tube is used as the most attractive embodiment. In addition this technique has the advantage that the bundle can be heated under high pressure so that the tubes are better mutually melted together. After completion of the glass body of the secondary emission electrode, this core is removed. One of the most widely used core materials is thin metal wire, for example, molybdenum wire having a diameter of 20 $\mu$. This wire is covered with a layer of the desired glass by drawing it through a bath of the molten glass, cutting it into pieces after cooling, bundling it, melting the assembly together and subsequently removing the core chemically. In contrast with the above-mentioned method, drawing operations are not carried out for this purpose.

In this method a kind of glass is required which has the desired electric conductivity at least on the inner side of the channels, is resistant to attack by the chemicals by which the core is removed, and can in addition be used on its own, that is to say, without a substrate glass.

A lead-bismuth containing glass is known from British Pat. specification No. 971,733 which glass is recommended for secondary emission electrodes and which when molten in an oxidizing atmosphere, does not have the required level of the electric conductivity but obtains this level by a reducing post-treatment at an increased temperature. This post-treatment is effected after completion of the glass body. Unfortunately this glass cannot be used on its own, but it requires a substrate glass. A further drawback of this glass is that the ultimate conductivity cannot be obtained in an easily reproducible manner because the glass is rather sensitive to small differences in pretreatment.

The present invention provides a range of glass compositions which are eminently suitable to be used in the above-described technique while using metal wire as a core, and which do not have the said drawbacks and can be reduced in an easily reproducible manner.

The glass according to the invention is characterized in that it has a composition within the range limited as follows in percent by weight:

| | | | |
|---|---|---|---|
| $SiO_2$ | 30–70 | PbO | 6–30 |
| $Al_2O_3$ | 0.5–10 | $Bi_2O_3$ | 2–45 |
| $B_2O_3$ | 5 | CaO+SrO | 8 |
| $Na_2O$ | 6 | MgO | 0.5–7 |
| $K_2O$ | 10 | $Sb_2O_3$ | 2 |

Due to the fact that molybdenum is a very suitable metal to be used as a core in wire form, the following range of compositions is preferred because the glasses within this range having their linear coefficients of expansion between 50 and 70 × $10^{-7}$ per °C. are adapted to the metal.

| | | | |
|---|---|---|---|
| $SiO_2$ | 40–50 | PbO | 6–30 |
| $Al_2O_3$ | 0.5–10 | $Bi_2O_3$ | 10–45 |
| $B_2O_3$ | 3 | CaO+SrO | 4 |
| $Na_2O$ | 2 | MgO | 3–6 |
| $K_2O$ | 3 | $Sb_2O_3$ | 2 |

The invention will now be described with reference to Table I which gives a number of glasses according to the invention, together with their softening points in °C. (which is the tem-

TABLE 1

| No. | Composition in percent by weight | | | | | | | | Softening point, °C. | $\alpha \cdot 10^7$ |
|---|---|---|---|---|---|---|---|---|---|---|
| | $SiO_2$ | $Al_2O_3$ | $Na_2O$ | $K_2O$ | PbO | $Bi_2O_3$ | MgO | $Sb_2O_3$ | | |
| 1 | 43.0 | 1.2 | 3.8 | 6.7 | 24.9 | 19.3 | 0.8 | 0.3 | 610 | 106 |
| 2 | 41.9 | 1.2 | 3.8 | 6.7 | 25.0 | 19.4 | 1.7 | 0.3 | 588 | 103 |
| 3 | 40.8 | 1.2 | 3.8 | 6.8 | 25.1 | 19.5 | 2.5 | 0.3 | 571 | 108 |
| 4 | 44.4 | 1.2 | 3.2 | 5.7 | 25.0 | 19.4 | 0.8 | 0.3 | 605 | 93 |
| 5 | 44.8 | 1.2 | 2.7 | 4.6 | 25.2 | 19.5 | 1.7 | 0.3 | 625 | 92 |
| 6 | 45.1 | 1.2 | 2.1 | 3.6 | 25.3 | 19.7 | 2.5 | 0.3 | 643 | 79.5 |
| 7 | 45.5 | 1.2 | 1.5 | 2.5 | 25.7 | 19.9 | 3.4 | 0.3 | 774 | 67.5 |
| 8 | 45.9 | 1.2 | 0.9 | 1.4 | 25.9 | 20.1 | 4.3 | 0.3 | 765 | 57 |
| 9 | 46.3 | 1.2 | 0.3 | 0.4 | 26.1 | 20.2 | 5.2 | 0.3 | 763 | 48 |
| 10 | 44.5 | 1.1 | 2.1 | 3.7 | 6.5 | 39.1 | 2.4 | 0.6 | 701 | 82 |
| 11 | 44.8 | 1.1 | 1.6 | 2.7 | 6.5 | 39.5 | 3.2 | 0.6 | 734 | 63 |
| 12 | 45.2 | 1.1 | 1.0 | 1.6 | 6.6 | 39.8 | 4.1 | 0.6 | 762 | 65 |
| 13 | 45.7 | 1.1 | 0.4 | 0.6 | 6.6 | 40.1 | 4.9 | 0.6 | 764 | 52 |
| 14 | 40.4 | 1.1 | 3.7 | 6.7 | 6.4 | 38.7 | 2.4 | 0.6 | 626 | 111 |
| 15 | 38.3 | 1.1 | 3.8 | 6.8 | 6.5 | 38.9 | 4.0 | 0.6 | 698 | 110 |
| 16 | 47.4 | 1.2 | 4.0 | 7.2 | 6.9 | 31.8 | 0.9 | 0.6 | 663 | 110 |
| 17 | 57.9 | 1.5 | 4.9 | 8.8 | 8.4 | 14.6 | 3.1 | 0.8 | 693 | 99.5 |
| 18 | 65.2 | 1.6 | 5.5 | 9.9 | 9.5 | 2.7 | 4.7 | 0.9 | 780 | 92 |
| 19 | 36.2 | 1.1 | 3.8 | 6.8 | 6.5 | 39.4 | 5.6 | 0.6 | 622 | 115 |
| 20 | 35.2 | 1.1 | 3.8 | 6.8 | 6.5 | 39.5 | 6.5 | 0.6 | 656 | 113 |
| 21 | 45.8 | 1.2 | 3.9 | 7.0 | 21.0 | 20.0 | 0.8 | 0.3 | 636 | 106.5 |
| 22 | 49.7 | 1.3 | 4.3 | 7.5 | 12.4 | 21.7 | 2.8 | 0.3 | 658 | 102 | perature at which the viscosity is $10^{7.6}$ poises) and their coefficients of expansion ($\alpha$) between 30° and 450° to 500° C.

Molybdenum wire having a thickness of 20 $\mu$ and surrounded by a tube of one of these glasses was passed through a vertical furnace, the wire being displaced at faster speed than the tube. Just before emerging from the furnace, the two were sealed, the glass layer obtaining a thickness of 20 $\mu$. The coated wire was wound on a drum provided with recesses. The wire reel was cut off later on the recesses. The fibers obtained were bundled, placed in a jig and subsequently heated under pressure until the fibers had melted together and the interstices had been filled up. The bundles were sawn into plates having a thickness of 1.5 mm.

The molybdenum wires were subsequently electrolytically dissolved in a weak alkaline bath containing ammonia and sodium hypochlorite at a voltage of 6 volts and at a reversal of the current direction at a period of 10 seconds. Subsequently, the glass body obtained was thoroughly rinsed, dried, heated in a hydrogen atmosphere and finally provided with metal coatings on either side by means of vapor deposition.

The following Table 2 shows for a few compositions a range of temperatures and the values of the surface resistance in Ohm per square obtained expressed in 10 log.$\alpha$. The period of heating was 2 hours.

There is an optimum heating temperature for each composition, it being possible to adjust a given value of the surface resistance in a reproducible manner.

TABLE 2

| Red. temp. (°/C.) | Glass sample No. | | | | | | | |
|---|---|---|---|---|---|---|---|---|
| | 3 | 4 | 5 | 6 | 9 | 10 | 13 | 15 |
| 250 | 14.53 | 14.72 | 14.73 | 15.05 | | 11.93 | 11.14 | 9.55 |
| 275 | 11.18 | 13.11 | 13.88 | 13.69 | | 9.60 | 9.66 | 9.07 |
| 300 | 10.47 | 11.00 | 10.86 | 11.30 | | 9.33 | 9.33 | 9.11 |
| 325 | 10.61 | 10.84 | 10.60 | 10.34 | | 9.34 | 9.03 | 9.28 |
| 350 | 10.60 | 10.99 | 10.61 | 10.03 | | 9.38 | 8.87 | 9.56 |
| 375 | 10.96 | 11.08 | 10.73 | 10.03 | | 9.46 | 8.87 | 9.61 |
| 400 | 11.10 | 11.26 | 10.83 | 10.21 | | 9.63 | 8.94 | 10.17 |
| 425 | 11.67 | 11.65 | 11.13 | 10.50 | 14.45 | 9.79 | 8.99 | 10.31 |
| 450 | 12.01 | 11.86 | 11.37 | 10.66 | 14.13 | 10.11 | 9.25 | 10.69 |
| 475 | | | | | 13.62 | | | |
| 500 | | | | | 12.82 | | | |
| 525 | | | | | 12.78 | | | |
| 550 | | | | | 13.10 | | | |

What is claimed is:

1. Glass consisting of a composition within the range limited as follows in percent by weight:

| | | | |
|---|---|---|---|
| SiO$_2$ | 30–70 | PbO | 6–30 |
| Al$_2$O$_3$ | 0.5–10 | Bi$_2$O$_3$ | 2–45 |
| B$_2$O$_3$ | 5 | CaO+SrO | 8 |
| Na$_2$O | 6 | MgO | 0.5–7 |
| K$_2$O | 10 | Sb$_2$O$_3$ | 2 | wherein said glass has a secondary emission factor greater than one and wherein said glass is particularly suitable for use in a secondary electrode after adjustment of the surface conductivity by heating in a reduced atmosphere.

2. Glass as claimed in claim 1, having a composition within the following limits in percent by weight:

| | | | |
|---|---|---|---|
| SiO$_2$ | 40–50 | PbO | 6–30 |
| Al$_2$O$_3$ | 0.5–10 | Bi$_2$O$_3$ | 10–45 |
| B$_2$O$_3$ | 3 | CaO+SrO | 4 |
| Na$_2$O | 2 | MgO | 3–6 |
| K$_2$O | 3 | Sb$_2$O$_3$ | 2 |

* * * * *

PO-1050
(5/69)

UNITED STATES PATENT OFFICE
CERTIFICATE OF CORRECTION

Patent No. 3,663,247            Dated May 16, 1972

Inventor(s) HENDRIKUS JOHAN LODEWIJK TRAP

It is certified that error appears in the above-identified patent and that said Letters Patent are hereby corrected as shown below:

Col. 2, line 40, before "5" and "8" insert -- $\leq$ --;

line 41, before "6" insert -- $\leq$ --;

line 42, before "10" and "2" insert -- $\leq$ --;

line 51, before "3" and "4" insert -- $\leq$ --;

line 52, before "2" insert -- $\leq$ --;

line 53, before "3" and "2" insert -- $\leq$ --.

Col. 4, Claim 1 (second column) before "5" "6" and "10"

insert -- $\leq$ --;

(fourth column) before "8" and "2"

insert -- $\leq$ --.

Col. 4, Claim 2 (second column) before "3" "2" and "3"

insert -- $\leq$ --;

(fourth column) before "4" and "2"

insert -- $\leq$ --.

Signed and sealed this 19th day of September 1972.

(SEAL)
Attest:

EDWARD M. FLETCHER, JR.                     ROBERT GOTTSCHALK
Attesting Officer                              Commissioner of Patents